Figure 1:
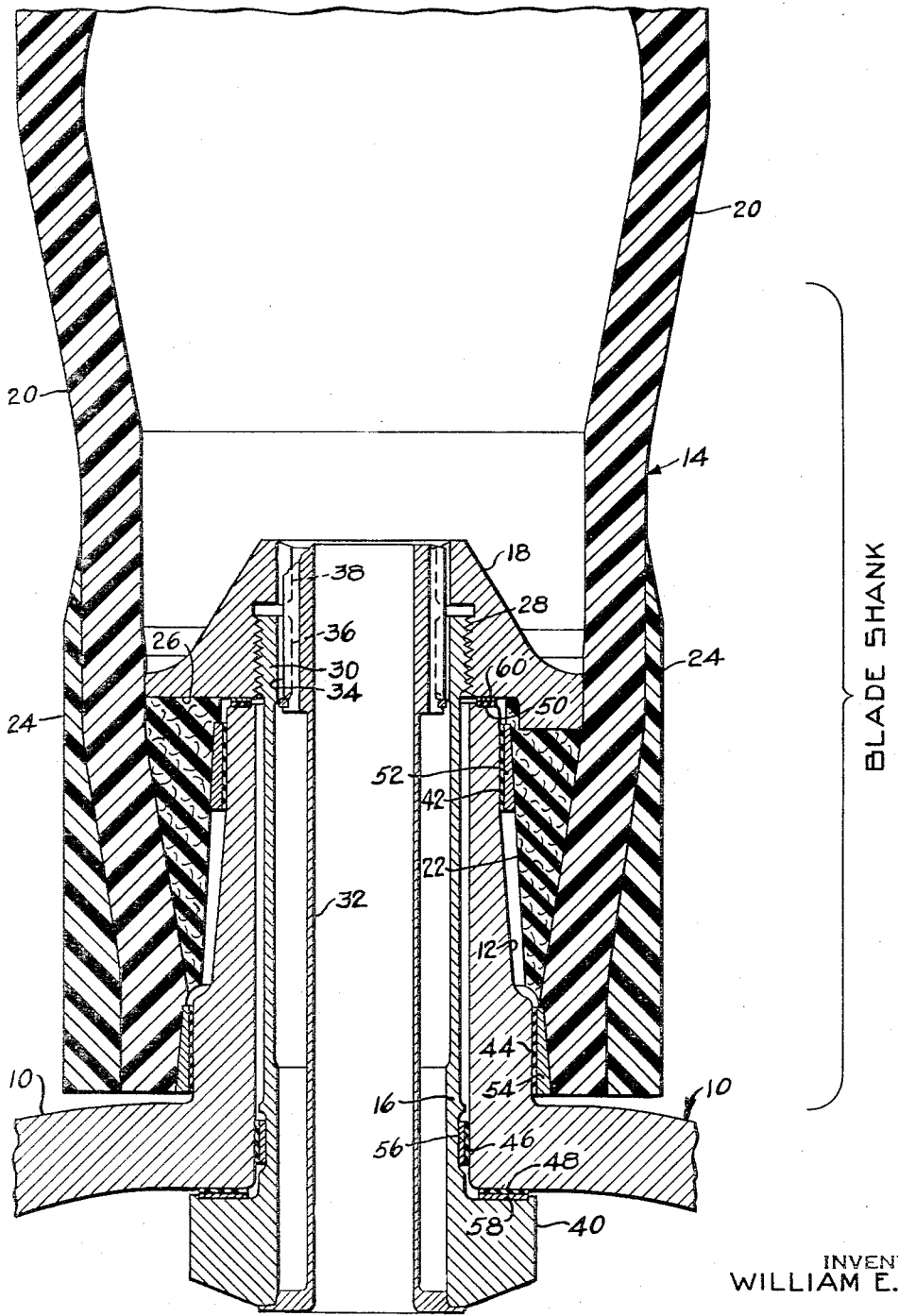

Feb. 14, 1967 W. E. BATES 3,303,889
PROPELLER BLADE AND HUB ASSEMBLY
Filed Feb. 15, 1966 2 Sheets-Sheet 1

INVENTOR
WILLIAM E. BATES
BY
William V. Ebs
HIS ATTORNEY

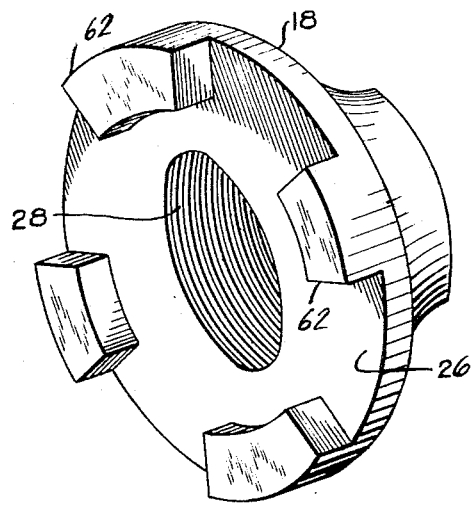

ature. The bearing 46 and hub spindle 12 extends within the blade shank and has the blade secured thereto

United States Patent Office 3,303,889
Patented Feb. 14, 1967

3,303,889
PROPELLER BLADE AND HUB ASSEMBLY
William E. Bates, Towaco, N.J., assignor to Curtiss-Wright Corporation, a corporation of Delaware
Filed Feb. 15, 1966, Ser. No. 527,687
4 Claims. (Cl. 170—160.58)

My invention relates to propeller blade and hub assemblies.

It is a prime object of the invention to significantly reduce the weight of aircraft propellers.

It is also an object of the invention to provide a simplified arrangement for retaining a propeller blade in a propeller hub while enabling pitch change adjustments of the blade.

It is another object of the invention to provide improved means for mounting a plastic propeller blade on a propeller hub.

It is still another object of the invention to provide an improved plastic propeller blade not having a heavy metal shank portion and which is therefore especially light in weight.

It is yet another object to simplify the construction of plastic propeller blades.

Other objects and advantages of the invention will become apparent hereinafter.

Propeller blades are usually mounted within hub sockets, the shank of a blade being mounted within a hub socket on bearings which constrain the propeller blade against outward movement while under the influence of centrifugal force due to rotation of the hub. The bearings also enable the blade to be turned on its own axis and pitch changes to be thereby effected. Blade and hub assemblies may, however, be substantially simplified and reduced in weight in accordance with the invention by mounting propeller blades, when constructed of lightweight materials, on a hub projection or spindle extending within the shank end of the blade, and providing load carrying structure between the blade and hub for constraining the blade against outward movement due to centrifugal force. The lighter weight material on the outside, rather than on the inside, of the assembly makes for a more efficient use of the materials from a weight standpoint. Preferably, the blade is constructed entirely of reinforced plastic materials and mounted for pitch change on plastic bearings located between the hub spindle and blade, as in the manner shown and described herein.

Referring to the drawings:

FIG. 1 is a fragmentary longitudinal section taken through a propeller blade and hub assembly incorporating the features of the invention; and FIG. 2 is a perspective view showing a component of the assembly of FIG. 1.

In the drawings, reference character 10 designates a propeller hub including a generally radially extending hollow spindle 12 on which a propeller blade 14 has been mounted for rotation by the hub. The spindle 12 extends within the blade shank and has the blade secured thereto by means of a load carrying member 16 and nut 18.

As shown, the blade 14 is constructed entirely of reinforced plastic materials and consists of three distinct portions 20, 22 and 24. Blade portion 20, which defines the configuration of the propeller blade beyond the shank end, is preferably formed of fiber glass-reinforced plastic material as, for example, in the manner described in United States Patent No. 3,008,859 for Method of Making Closed Shapes of Reinforced Plastic of K. G. Smack, issued November 14, 1961, that is, with an evacuated granular-filled bag as a mandrel. The mandrel should, however, contain the nut 18 and the bag should be ruptured and withdrawn from the blade leaving the nut within the blade portion 20 after its completion. The interior of blade portion 20 should be machined in the region of the shank after withdrawal of the bag and the nut 18 cemented at its edges to the machined interior surface preparatory to the formation of wedge-shaped portion 22.

After the nut has been cemented in position, wedge-shaped portion 22 may be formed by injecting a plastic molding compound capable of withstanding high compressive stress into the space defined by the interior machined surface of blade portion 20, the notched end 26 of nut 18 and a suitable shaped nozzle held in position by a screw-connection with threads 28 on the nut 18. The molding compound bonds itself to the blade portion 20. Nevertheless, it is preferable to have the interior surface of blade portion 20 against which wedge-shaped portion 22 is formed slightly elliptical in shape to also provide a mechanical interlock rotationally between blade portion 20 and the blade portion 22 after its formation. The molding compound used in forming blade portion 22 is preferably a chopped-fiber-reinforced molding compound as, for example, an epoxy resin reinforced with chopped fiber glass.

Portion 24 is formed of resin-impregnated filament windings which are applied under tension to the blade portion 20 in such fashion as to increase the thickness of the windings toward the inboard end of the blade.

The propeller blade 14 is assembled onto the hub spindle 12 by screwing the threaded end 30 of load carrying member 16 into the threads 28 of the nut 18 and inserting a key 32 into the member 16 to interlock splines 34 on the key with splines 36 on the load carrying member and splines 38 on the nut 18. The nut 18 acting on the blade 14 through wedge-shaped portion 22, and the member 16 acting to transmit loads on the nut to the hub 10 through flange 40 oppose the tendency of the blade to move outwardly from the hub due to centrifugal forces on the blade caused by rotation of the hub. Blade portion 24 formed of resin-impregnated filament windings resists any forces exerted on the blade portion 20 by the wedge-shaped portion 22 tending to flare the shank end of the blade away from the hub spindle 12.

Bearings are provided between blade 14 and hub 10, between the load carrying member 16 and hub, and between the nut 18 and hub so that the blade may be turned freely about its axis and pitch changes thereby effected. As shown, bearings 42 and 44 rotatably support the blade on the hub spindle 12 and bearing 46 rotatably centers the load carrying member 16 on the spindle. Thrust bearing 48 is provided between flange 40 of member 16 and the hub 10, and preload bearing 50 is provided between nut 18 and the hub spindle. The bearings 42, 44, 46, 48 and 50 are preferably formed of a suitable plastic bearing material such as nylon or Teflon and provided with metal backing rings 52, 54, 56, 58 and 60, respectively, to which the bearing layers of plastic material are adhesively secured as with an epoxy cement. The backing rings are secured in place in the assembly in any suitable manner as, for example, with an epoxy-type adhesive or by a press fit.

Pitch changes are accomplished by angularly moving the flange 40 about the axis of the spindle so as to cause the nut 18 to turn. The nut acting through projections 62 embedded in plastic blade portion 22 turn the blade and pitch changes are thereby effected. The flange 40 may be adapted as required for attachment to pitch control mechanism.

Although only one embodiment of the invention has been shown and described, it will be apparent to those skilled in the art that various changes and modifications may be made therein without departing from the spirit and scope of the invention. I aim to cover all such changes and modifications in the appended claims.

I claim:

1. In combination, a propeller blade of reinforced plastic material having a hollow shank, a propeller hub including a generally radially extending hollow projection which extends into the shank of the blade, and a blade holding nut held against movement outwardly from said projection, the blade including a first shank portion which tapers inwardly toward the hub, a second portion within the first portion in engagement with the first portion and the nut for transferring centrifugal loads on the blade to the nut, and a third portion extending around the first portion to prevent the first portion from flaring outwardly from the hub projection.

2. The combination of claim 1 including a bearing between the second blade portion and hub projection and a bearing between the first blade portion and hub projection supporting the blade for pitch changing movements.

3. The combination of claim 1 including a structural member within the hub projection, said structural member being secured at one end to the nut and restrained at the opposite end by the inside surface of the hub against movement outwardly from the hub.

4. The combination of claim 3 including a bearing between the structural member and hub projection, between the blade and hub projection, and between the nut and hub projection for rotatably supporting the structural member, blade and nut.

References Cited by the Examiner

UNITED STATES PATENTS 2,054,810  9/1936  Gaba _____ 170—160.58 X
2,706,007  4/1955  Taylor _____ 170—160.58 X MARTIN P. SCHWADRON, *Primary Examiner.*

EVERETTE A. POWELL, JR., *Examiner.*